US012197582B2

(12) United States Patent
Fong et al.

(10) Patent No.: US 12,197,582 B2
(45) Date of Patent: Jan. 14, 2025

(54) IMPLEMENTATION OF TRUSTED COMPUTING SYSTEM BASED ON MASTER CONTROLLER OF SOLID-STATE DRIVE

(71) Applicant: MAXIO Technology (Hangzhou) Co., Ltd., Hangzhou Zhejiang (CN)

(72) Inventors: George Fong, Hangzhou Zhejiang (CN); BingJun Chen, Hangzhou Zhejiang (CN); GuoYang Li, Hangzhou Zhejiang (CN); ChenLuan Wang, Hangzhou Zhejiang (CN); ZiHua Xiao, Hangzhou Zhejiang (CN); Hui Jiang, Hangzhou Zhejiang (CN)

(73) Assignee: MAXIO Technology (Hangzhou) Co., Ltd., Hangzhou Zhejiang (CN)

( * ) Notice: Subject to any disclaimer, the term of this patent is extended or adjusted under 35 U.S.C. 154(b) by 729 days.

(21) Appl. No.: 17/424,960

(22) PCT Filed: Mar. 17, 2020

(86) PCT No.: PCT/CN2020/079740
§ 371 (c)(1),
(2) Date: Jul. 22, 2021

(87) PCT Pub. No.: WO2020/187206
PCT Pub. Date: Sep. 24, 2020

(65) Prior Publication Data
US 2022/0092189 A1    Mar. 24, 2022

(30) Foreign Application Priority Data

Mar. 19, 2019    (CN) .......................... 201910208445.1

(51) Int. Cl.
*G06F 21/57*    (2013.01)
*G06F 21/10*    (2013.01)
(Continued)

(52) U.S. Cl.
CPC ............ *G06F 21/575* (2013.01); *G06F 21/32* (2013.01); *G06F 21/602* (2013.01); *G06F 21/64* (2013.01); *G06F 21/78* (2013.01); *G06F 21/107* (2023.08)

(58) Field of Classification Search
CPC ...... G06F 21/575; G06F 21/32; G06F 21/602; G06F 21/64; G06F 21/78; G06F 21/107
See application file for complete search history.

(56) References Cited

U.S. PATENT DOCUMENTS

2003/0041255 A1    2/2003  Chen et al.
2006/0015717 A1*   1/2006  Liu .......................... G06F 21/57
                                                            713/181
(Continued)

FOREIGN PATENT DOCUMENTS

CN    101488177 A    7/2009
CN    102262599 A    11/2011
(Continued)

OTHER PUBLICATIONS

International Search Report (including English translation) and Written Opinion for International Application No. PCT/CN2020/079740, dated Jun. 2, 2020, 12 pages.

*Primary Examiner* — Jung W Kim
*Assistant Examiner* — Alan L Kong
(74) *Attorney, Agent, or Firm* — Westman, Champlin & Koehler, P.A.

(57) ABSTRACT

The present disclosure relates to an implementation for a trusted computing system. According to the embodiments of the present disclosure, a master controller in an SSD, which is necessarily configured in the system, is used to provide all necessary security functionality of the system's RoT. The system does not need to contain any special RoT chip or module, does not need any modifications in the system design, is easy to adopt, and can be implemented by any (Continued)

system comprising a hard drive. All necessary security functions are completed by the master controller of the system's hard drive. Thus, not only can the cost of the security module be reduced, but more importantly, the mechanism directly protects information and resources (e.g., operating system, user programs, user data, etc.) that actually need to be protected in the system, and once the mechanism is enabled, the protection function cannot be bypassed.

15 Claims, 5 Drawing Sheets

(51) Int. Cl.
*G06F 21/32* (2013.01)
*G06F 21/60* (2013.01)
*G06F 21/64* (2013.01)
*G06F 21/78* (2013.01)

(56) References Cited

U.S. PATENT DOCUMENTS

| | | | | |
|---|---|---|---|---|
| 2008/0072071 | A1* | 3/2008 | Forehand | G06F 21/602 713/193 |
| 2009/0172378 | A1* | 7/2009 | Kazmierczak | G06F 21/575 713/2 |
| 2009/0319806 | A1* | 12/2009 | Smith | G06F 21/575 726/19 |
| 2010/0191944 | A1* | 7/2010 | Numata | G06F 21/575 713/1 |
| 2011/0138166 | A1* | 6/2011 | Peszek | G06F 21/575 713/2 |
| 2015/0033065 | A1* | 1/2015 | Canepa | G06F 11/1008 714/6.11 |
| 2015/0242657 | A1 | 8/2015 | Kim | |
| 2016/0048459 | A1* | 2/2016 | Oh | G06F 12/0246 711/103 |

FOREIGN PATENT DOCUMENTS

| CN | 104881374 A | 9/2015 |
|---|---|---|
| CN | 109918918 A | 6/2019 |

* cited by examiner

IMPLEMENTATION OF TRUSTED COMPUTING SYSTEM BASED ON MASTER CONTROLLER OF SOLID-STATE DRIVE

CROSS-REFERENCE TO RELATED APPLICATIONS

This application is a Section 371 National Stage application of International Application No. PCT/CN2020/079740, filed on Mar. 17, 2020, which published as WO/2020/187206 on Sep. 24, 2020, not in English, and claims priority to Chinese patent Application No. 201910208445.1, filed on Mar. 19, 2019, entitled "System, Apparatus and Operation Method for Trusted Computing Platform Based on Master Controller of Solid-State Drive", the entire contents of which are incorporated herein by reference in their entireties.

TECHNICAL FIELD

The invention relates to a field of trusted computing, in particular to a system architecture and an implementation method which are easy to be implemented effectively.

BACKGROUND

A trusted computing system, as a technical solution to protect information security and resist malicious attacks on computer systems, has been paid more and more attention by those who are responsible for researching, developing, producing and using the computing systems.

Most modern computer systems are directly or indirectly connected to network systems at different stages of their life cycle, exposing themselves to malicious attacks more or less. Results of the malicious attacks may directly lead to adverse outcomes including the following:
1. computing system paralysis caused by damages on the computing systems;
2. sensitive information interceptions;
3. kidnapping of the computing systems.

These adverse outcomes may further lead to irreversible damaging consequences in finance, politics, diplomacy, military affairs or user experience related situations. In order to achieve the above attacking purposes, a common means used by a malicious attacker is to try to tamper with software components in the system, or try to implant a malicious piece of software, such as a Trojan horse program, a computer virus, and so on, into the attacked system, wherein the malicious software may be activated by some predetermined events and execute a malicious behavior beneficial to its designer and releaser. There are two noteworthy features in the above-mentioned attacking processes:
1. the above-mentioned attacks inevitably lead to changes on some measurable characteristics in the system;
2. in order to produce results expected by the attacker, the tampered system software or the implanted malicious software must be executed.

Various solutions on protecting the system in trusted computing systems take advantages of these two features. In simple terms, unauthorized tampering can be detected by measuring certain characteristics of important components in the system. Once the unauthorized tampering is discovered, corresponding software and firmware modules will be prohibited from being executed, to ensure security of the system.

System Boot Chain

Modern computer systems have to go through a series of steps to enter a normal operation state after being powered on. A brief description is given below with reference to FIG. 3.

1. System Firmware Boot

Figure 3:
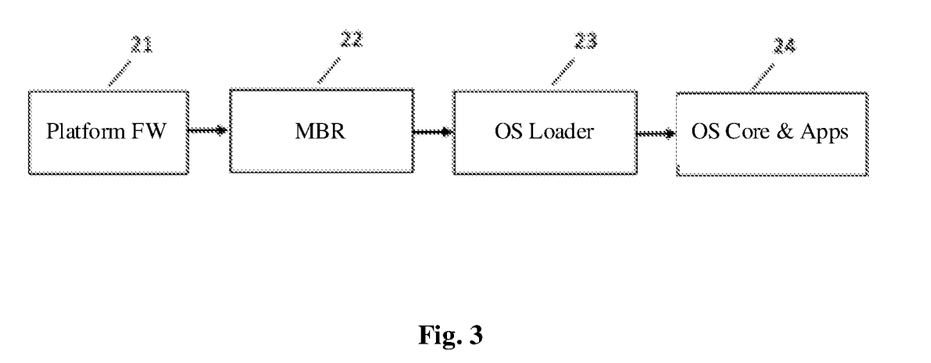
FIG. 3 shows a schematic diagram of a system boot chain.
Figure 4:
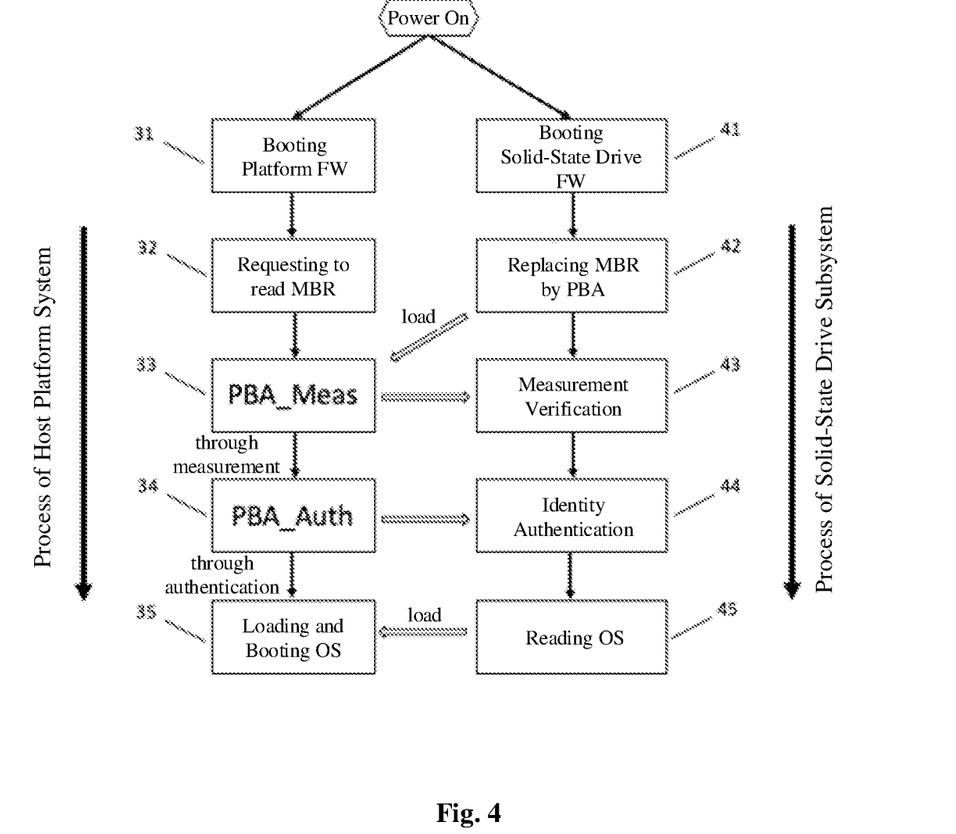
FIG. 4 shows a flow chart of a system operating process according to an embodiment of the present disclosure.
Figure 5:
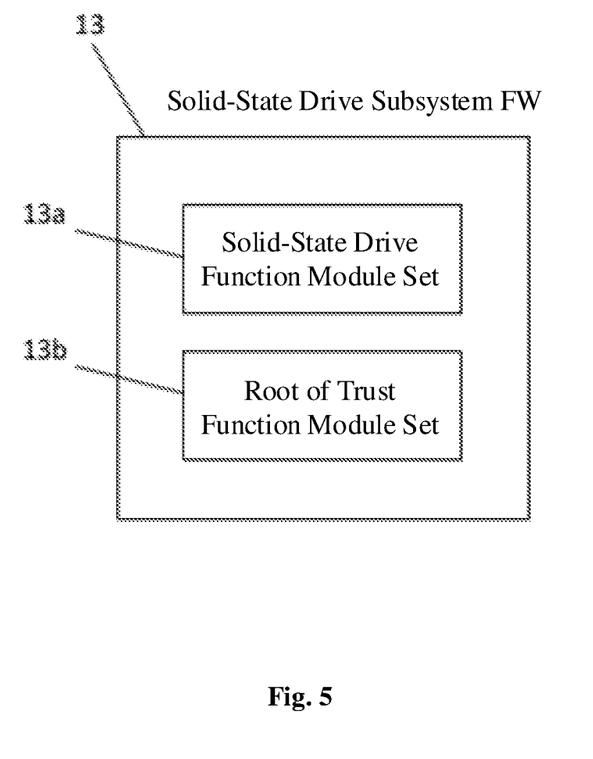
FIG. 5 shows a block diagram of firmware construction of a solid-state drive subsystem according to an embodiment of the present disclosure.

A module to be first executed after the system is powered up is system firmware 21. The most commonly used system firmware is a traditional BIOS or a relatively new UEFI firmware based on international standard. A function of the system firmware 21 is to perform power-on-self-test (POST) to ensure that the hardware of the system works normally, then read a master boot record (MBR) module 22 from a hard drive and transfer control to the master boot record module 22.

2. The master boot record module loads and executes OS loader module 23.

3. A function of the OS Loader module is to read the operating system from the hard drive and import it into the system's main memory. After the import is completed, control is transferred to the operating system 24.

4. Operating system 24 Boot

The import and operation of the operating system 24 represent that the startup process is completed, and the computer system enters a normal operation mode.

System Measurement and Control Transfer

As mentioned above, a basic requirement for ensuring security and trustworthiness of a computing system is that all programs executed by the system since the system is powered on, are untampered software confirmed to be safe. A widely used method is to measure, based on cryptographic algorithms, a software module before it is started, and determine whether the software module is in a trustworthy status according to the measurement result. Only after it is determined to be safe can the software module get its execution permission.

The above-mentioned security mechanism based on measurements can be used in the system boot chain to ensure the safety and trustworthiness of system operating environment. Specifically, after the system is powered on, the system firmware itself is first measured by the measurement function of the system firmware (e.g. BIOS/UEFI FW).

A commonly used measurement method is to calculate a characteristic signature of the measured program code and data, by using a Hash function (SHA256, SM3, etc.). If a measured value obtained for a code module (or a module group) before the code module is granted to have an execution permission is equal to a pre-stored measured value which is obtained for the same code module under a known trustworthy condition, the code module is judged to be safe and then the execution permission can be granted.

After the system firmware completes the measurement on itself, if the measurement result meets security requirements, the boot loader (possibly more than one stage) of the operating system will be measured by the system firmware. If the boot loader passes the verification, it will be loaded into the main memory of the system and start to be executed.

The boot loader performs similar measurement on the next stage which may well be the final target of the startup chain, the executable code of the operating system stored on a non-volatile storage medium, to obtain the characteristic signature of the operating system. After the characteristic signature is compared with and proved to be consistent with the pre-stored measurement which is obtained under a known secure condition, the operating system code will be loaded into the main memory by the boot loader and start to be executed. At this point, the system's secure boot process is completed.

Functional Introduction of Security Modules

A security module plays an important role in completing the above-mentioned measurement-based security schemes in a trusted computing system. It provides security related functions and resources including: a true random number generator (TRNG), a protected storage space, a set of cryptographic algorithm engines (e.g., SHA, SM3, RSA, SM2, etc.) required by the measurement and various cryptographic service interface functions, etc. There are industry standards established by related agencies in China and by relevant international organizations to provide design specifications for such products, such as:

TPM (Trusted Platform Module): TPM is a standard formulated by an international organization TCG (Trusted Computing Group). A portion of the system firmware and the TPM together constitute the root of trust for a computing system.

TCM (Trusted Cryptography Module): TCM is a standard formulated under the auspices of the State Cryptography Administration of China. The functionality of TCM is similar to that of TPM, but the cryptographic algorithm set (RSA, SHA, AES) is replaced by the Chinese-standard national cryptographic algorithm set (SM2, SM3, SM4) in TCM, and the root of trust is composed of the TCM and relevant modules in the system firmware that calls functions provided by the TCM.

TPCM (Trusted Platform Control Module): TPCM is a standard defined in "Trusted Platform Control Module Specification" issued by China National Information Security Standards Committee. This specification provides a new trusted computing platform architecture to rectify a common problem existing in TPM/TCM, that is, contribution to security by a security module (TPM/TCM) is completely passive, and the system firmware must voluntarily utilize security functions contained in TPM/TCM and abide by security protocol to ensure security and trustworthiness. However, startup of the system firmware itself is not controlled by security mechanism based on the measurement results, which cannot ensure that the system firmware is in a trustworthy state during the startup, hence representing a potential security threat. To overcome this weakness, trusted computing platforms based on TPCM additionally provide control on the execution of the system firmware itself, incorporating the system firmware into the same 'measurement-controlled-execution' security mechanism. The root of trust of the system is the TPCM itself. Its security compliance is verified and certified by an independent process. Once the TPCM is certified, its own trustworthiness is a given. Design of the system ensures that power is first applied to TPCM during the power-up process of the system, while rest of the system is disabled. A TPCM is an active component that contains all resources that a TCM has. However, a most significant difference between TCM and TPCM is that, TPCM can control the operation state of other components (system CPU and firmware, etc.) in the system, and can actively complete the measurement on system firmware when other parts of the system are in a disabled state, to determine whether the system firmware is in a trustworthy state. Once the trustworthiness of the system firmware is confirmed, the TPCM initiates the measurement-controlled execution flow of the rest of the system boot chain.

Security Analysis and Existing Problems of Conventional Solutions

As mentioned above, systems based on TPM and TCM have intrinsic weakness because TPM or TCM themselves cannot form a complete root of trust of the system. TPCM can independently constitute a root of trust of the system, and make the measurement of the system firmware a step enforced by the system hardware, which improves the security and trustworthiness of the system.

Although applications of TPCM is helpful to improve the trustworthiness of the system, there are still associated undesirable characteristics that cannot be ignored in terms of system security and feasibility, including:

Because TPCM can only control power up and enabling signals of the subsequent components in the system boot chain, the security of the system can only be established if malicious attackers cannot directly modify system wirings. In other words, it is difficult for attackers to carry out remote attacks. However, once the attacker gains physical control of the system, the security mechanism imposed by TPCM can be easily bypassed and lose its efficacy.

TPCM and the corresponding security mechanism require modifications to the design of the computer system, including the design of the computer motherboard, the design of the system firmware and possibly other components in the system boot chain. These necessary modifications make it more difficult to promote and implement the security solution, thus making it difficult to achieve its wide adoption.

Utilizing TPCM increases system cost, thus, TPCM is difficult to be used in cost-sensitive application fields (such as consumer computers, etc.).

Figure 2:
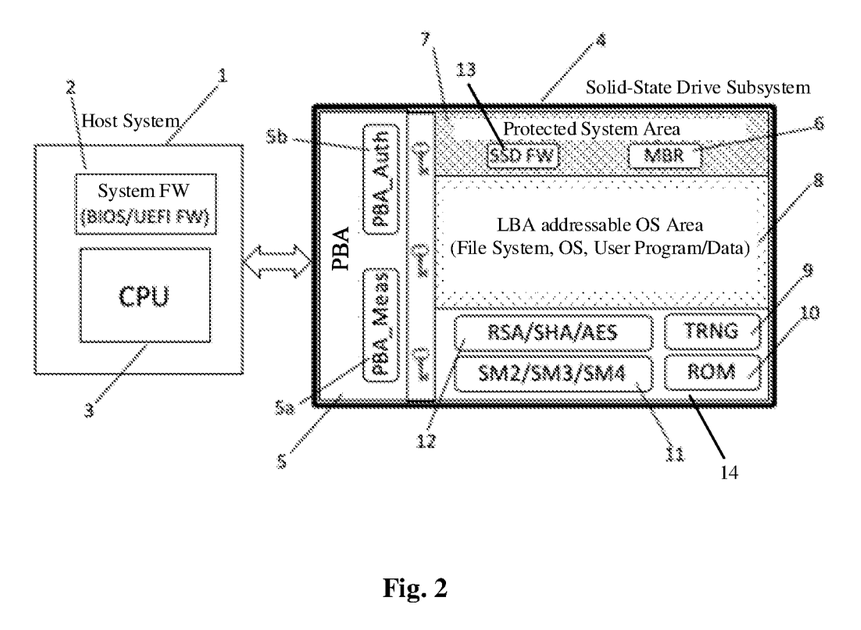
FIG. 2 shows a block diagram of an embodiment of the present disclosure.

Further analysis of the system boot chain can provide clues to solve the above problems. Referring to FIG. 2, the operations performed by the system after the system is powered on can be regarded as establishing two environments, namely, a boot environment and an operating environment. The boot environment comprises the system firmware and stages of boot loader programs, and the operating environment comprises the operating system and its low level drivers and file systems etc. The secure boot environment is necessitated to load and set up the secure operating environment. In order to ensure the security and integrity of the system, conventional solutions adopt a methodology based on sequential "measurement followed by activation" of each of the stages in the system boot chain, starting from the root of trust of the system. Each stage is responsible for carrying out measurement on the next stage in the boot chain then activate it if the measurement is deemed fit. Assuming that the system can only set up the operating environment including the operating system through an N-stage boot sequence from when the system is powered on, this process can be represented as follows:

$$T_0 \Rightarrow T_1 \ldots T_{N-1} \Rightarrow T_N$$

In the above notation, $T_0$ stands for the system firmware or TPCM, depending on the system scheme. $T_N$ is the operating system itself. "$\Rightarrow$" represents the operation to measure the adjacent downstream module and to transfer control to the module if the measurement result meets security requirements.

The root of trust of the system in conventional designs is always the first stage of the system boot chain, namely the first module being powered up, and is represented as $T_0$ in the above expression. However, under the premise of satisfying certain conditions, the above-mentioned method to measure in sequence and to transfer trusted control in sequence is not always necessary. The root of trust can be set up at any stage Ti in the boot chain, as long as the following conditions are met:

C.1: 'I', can not be modified by $T_j$ (j<i)
C.2: The operation of $T_i$ does not require the resources and functions of $T_j$ (j<i)
C.3: $T_i$ can measure $T_j$ (j<i) to confirm the security status of $T_j$
C.4: $T_{i+1}$ can be loaded and measured by $T_i$ According to the present disclosure, the root of trust of the system is set up on an intermediate stage in the boot chain. With this arrangement, not only all the required functions of the root of trust of the system can be accomplished, but some additional advantages can be realized as well. Specifically, the present disclosure sets up the root of trust in the master controller of a solid-state drive. With the assistance of a pre-boot authentication (PBA) module, embodiments of the present disclosure can complete all functions required by a root of trust of the system, and do not require any modification on system design, and additional hardware overhead can be completely avoided.

A component serving as the root of trust of the system is required to have the following resources and functions:

1. cryptographic algorithm engines, including RSA, AES, SHA, SM2, SM3, SM4, and so on;
2. random number generator, configured to generate keys, etc., wherein random code generated by the random number generator is required to have certain cryptographic strengths (which can meet the requirements of FIPS 140-2 or GM/T 0005, and so on);
3. protected storage space, configured to store sensitive information and data, wherein access to this storage space is strictly controlled, and corresponding access rules depend on the security protocol which is implemented;
4. cryptography function invocation interface, configured to complete system measurement, identity authentication and other related functions.

Incidentally, the above-mentioned resources and the functions which are necessary for realizing the root of trust of the system, are also necessary for realizing the functionality of the self-encrypting solid-state drive, as such the resources and the functions naturally exist in the master controller of the solid-state drive. In fact, these functions have already been used to implement industry standard data security protocols such as TCG-Opal. According to the present disclosure, the resources and the functions which are naturally existed in the system are used to form a simple and effective root of trust of the system, thus assist in implementing a trusted computing platform function in addition to the original data protection functions of the solid-state drive.

SED/MBR Shadowing Introduction

Hard drives (including solid-state drives) with data encryption functionality are referred to as SEDs (Self-Encrypting Drives) in the industry. SEDs usually have an 'MBR Shadowing' function, in addition to the data encryption protection functions, referring to FIG. 1.

Figure 1:
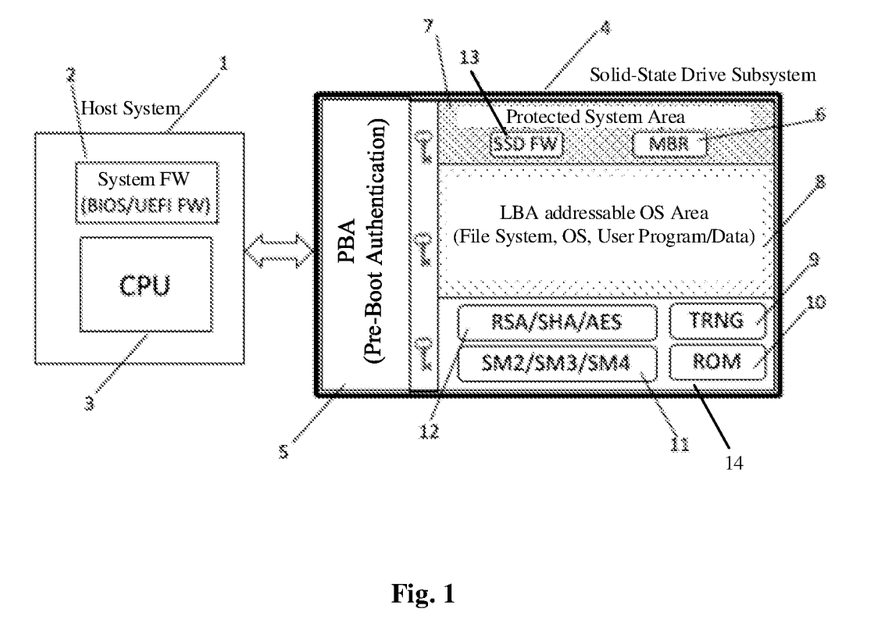
FIG. 1 shows a block diagram of a conventional structure of a solid-state drive which is a self-encrypting drive (SED)

When the MBR shadowing function is enabled, the operating system's Master Boot Record (MBR) on the system disk will be transferred to and hidden in a protected special system-data storage area inaccessible directly, and the loader of an identity authentication code module is put in place of the original operating system's boot block which achieves the function of 'Pre-Boot Authentication (PBA)'. Only after identity authentication is passed, the content of MBR can be released and executed, and the system can then be booted. Before the identity authentication is passed, only the PBA module is visible to the system, and all of the rest of the data on the drive is protected by protection mechanisms including encryption. The boot chain of aforementioned system is as follows:

Sys FW=>PBA=>OS Loader=>OS

Wherein:
Sys FW=Platform or System Firmware (BIOS or UEFI FW)
PBA=Pre-Boot Authentication Module
OS Loader=Operating System Bootstrap Modules
OS=Operating System
RoT=Root of Trust As can be seen from the above-mentioned figure, SSD subsystem contains all the functions and resources (including TRNG, cryptographic algorithm engine and read-only memory ROM) which are required to constitute the root of trust of the system, without any additional hardware overhead, and cannot be bypassed once the protection mechanism is enabled. As long as the aforementioned requirements C1-C.4 are satisfied, an SSD Subsystem can serve as an ideal root of trust of the system.

The rationality of building a root of trust in the SSD subsystem can be supported by another observation. In fact, in computing systems equipped with a solid-state drive, information that truly needs to be protected is stored in the solid-state drive (assuming that there is only one hard drive in the system, or other hard drives in the system are not used to store sensitive information, or other hard drives may also store sensitive information but already contain a protection mechanism which cannot be deactivated until the identity authentication is completed by the system). Imagine that the solid-state drive is removed from the system, the rest of the system cannot directly affect the security state of the protected information contained within. Therefore, as long as the solid-state drive subsystem can ensure its own security while it's able to measure the security status of other parts of the system, the entire system can be made safe and trustworthy.

SUMMARY

According to the above discussion, in order to solve various problems of the above-mentioned traditional trusted computing platform schemes, the present disclosure provides an implementation of a trusted computing platform based on the master controller of a solid-state drive. The implementation provided by the present disclosure has following advantages:

system measurement is collectively completed in a single stage without any modification to the system design, instead of performed sequentially stage by stage;
additional cost overhead brought about by TPM/TCM/TPCM is avoided;
the implementation is suitable for any host interface;
the protection effects cannot be bypassed;
it is suitable both as a factory-installed solution or as an after-market solution.

The present disclosure provides a technical solution for realizing a trusted computing platform, which comprises the following components referring to FIG. 2:

A host system and a solid-state drive subsystem is provided, wherein the host system comprises:
a central processing unit (CPU);
a system firmware (e.g., Traditional BIOS or UEFI FW);
a peripheral device bus interface (such as SATA or PCIe, etc.);
wherein the solid-state drive subsystem comprises:
at least one host interface configured to be connected to the peripheral device bus interface of the host system;
an embedded processor unit (MCU);
a read only memory (ROM) configured to store a firmware of the solid-state drive subsystem;
a true random number generator (TRNG);
a set of cryptographic algorithm engines configured to implement an international standard algorithm set (cypher suite, such as RSA, SHA, AES) or other cypher suites, such as the Chinese National Standard algorithm set (SM2, SM3, SM4), etc.;
a pre-boot identity authentication module PBA, which comprises following submodules:
a system measure submodule (PBA_Meas) configured to measure the system's operation environment including the system firmware to determine a current security status of the system;
a user identity authentication submodule (PBA_Auth), configured to determine whether a current user has a proper access permission;
a protected system-data storage for storing system data and system programs, wherein the system-data storage area is out of the addressable range of the operating system and cannot be accessed by a logical block address (LBA);
at least one operating system data space (OS Area), configured to store the operating system, file systems, and user programs and user data, wherein the OS Area is in a protected and locked state before the PBA module completes measurements of the system and passed the user identity authentication; only after the system measurement and the identity authentication are passed, the OS Area or a subspace comprised in the OS Area is available to be read, written and/or erased depending on the user's access permission.

A method for implementing a root of trust of a system based on a solid-state drive subsystem is also provided, wherein the method comprises the following steps:

Step S1a: After the system is powered on, a Platform firmware of the system starts to run according to a conventional means. This is because all other components in the system, except the solid-state drive subsystem, can be the same as those of a conventional solution. After the Platform Firmware completes a system hardware self-checking function and other conventional functions, it issues a request to read a boot module of an operating system from the solid-state drive subsystem in a traditional way.

Step S1b: During a power-on process of the system, the firmware in the SSD subsystem starts to run and performs various functions required by a traditional SSD. In this step, according to the present disclosure, the root of trust of the system based on a master controller of the SSD can be set up, and comprises a root of trust for measurement, a root of trust for storage and a root of trust for reporting.

Step S2: According to the present disclosure, the boot module of the operating system in the solid-state disk subsystem is hidden in a protected system-data storage. The storage space, which is configured to store the boot module of the operating system in a traditional solution, is configured to store the loader of a special module of PBA instead, according to the present disclosure. The above-mentioned boot module read request can only be responded with this special module which is the only module available to be read at the current stage in the solid-state drive subsystem, that is, the special module of PBA. After the boot module of PBA is loaded into the memory and executed, a PBA function module designed according to functional requirements of the present disclosure will be loaded from the solid-state drive and executed.

Step S3: All operations in the above steps S1 and S2 can be same as those in a traditional solution. A particular feature of the present disclosure is a function performed by the PBA module loaded at step S2, wherein steps executed in sequence by the PBA comprises:

Step S3a: A root of trust of the system submodule in the PBA module realizes the root of trust for measurement, the root of trust for storage and the root of trust for reporting. The root of trust for measurement is configured to measure prior stages which at least comprise the Platform Firmware, subsequent stages which comprise the boot module of the system (OS Loader), the operating system (OS) and user security applications, etc., and other system measurable features (such as CPU serial number, MAC address, etc.) in the system boot chain in this step, to determine that the system operating environment is in a known and trustworthy state. Measurement results can be stored in a protected storage space by the RoT for storage, and a relevant report can be issued by the RoT for reporting.

Step S3b: After the system measurement is passed successfully, the system control right is transferred to an identity authentication submodule. The module can collect, process and construct user identity authentication information (such as passwords, fingerprints, voice analysis results, etc.) according to design requirements, and use this information to carry out one-way authentication or two-way cross-authentication with the solid-state drive subsystem. Only those users who pass the identity authentication can obtain a corresponding access permission for reading, writing and/or erasing.

According to the present disclosure, embodiments of the disk controller based root of trust solutions have a distinct beneficial effect that the master controller of the solid-state drive necessarily configured in the system can be additionally given the functionality of a root of trust of the system which is easy to be implemented and is effective. Based on this root of trust, a trusted computing platform can be constructed. Embodiments of the present disclosure save cost, do not require any modification to the system design, and the protection effects cannot be bypassed. Embodiments of the present disclosure can be applied as factory-installed solutions, and can also be applied as after-market solutions. As a factory-installed solution, it is only necessary to install the solid-state drive according to the embodiments of the present disclosure during the production of the system. As an after-market solution, it is only necessary to replace a hard drive in the system with a solid-state drive according to the embodiments of the present disclosure.

TERM INTERPRETATIONS

1. CPU: Central Processing Unit
2. BIOS: Basic Input Output System
3. FW: Firmware
4. UEFI FW: Firmware conforming to UEFI international standard
5. Platform FW: Platform firmware, which can be BIOS or UEFI FW
6. PBA: Pre-boot-authentication
7. SSD: Solid-state Drive
8. MBR: Master Boot Record
9. TRNG: True Random Number Generator
10. ROM: Read Only Memory
11. PBA_Meas: System Measure Functional Group in PBA
12. PBA_Auth: Authentication Functional Group in the PBA
13. OS Loader: Operating System Boot Module
14. OS Core & Apps: Operating System Core and Applications
15. SED: Self Encrypting Drive
16. RSA: International-Standard Public Key System Encryption Algorithm
17. SHA: International-Standard Hash Algorithm
18. AES: Advanced Encryption Standard, which is an International Standard of Block
Encryption Algorithm
19. SM2: Chinese-National-Standard Public Key System Encryption Algorithm
20. SM3: Chinese-National-Standard Hashing Algorithm
21. SM4: Chinese-National-Standard Block Encryption Algorithm
22. TPM: International-Standard Trusted Platform Module/Root Module
23. TCM: Chinese-National-Standard Trusted Cryptography Module/Root Module
24. TPCM: Trusted Platform Control Module
25. RoT: Root of Trust

DETAILED DESCRIPTION

Principles and features of the present disclosure are described below. When taken in conjunction with the accompanying drawings, and examples given in the present disclosure are intended to explain the invention only and are not intended to limit the scope of the invention.

FIG. 2 shows a block diagram of the basic structure of a solid-state drive according to an embodiment of the present disclosure. Basic architecture of the solid-state drive according to the present disclosure is similar to a traditional SED (Self-Encrypting Drive) including an MCU, Flash memory medium chips or dies, a crypto engine which performs relevant cryptographic algorithms, a true random number generator (TRNG), a read only memory (ROM) and the likes. Other system components related to the operations of traditional solid-state drives are not key points of the present disclosure and are not enumerated here. A firmware for controlling various operations of the solid-state drive and a firmware used for realizing a functional group of the root of trust of the system according to the present disclosure are stored in the ROM and a system-data storage space. It is worth noting that the characteristic that the above-mentioned ROM cannot be modified after a master control chip leaves its chip production line is one of the key reasons why the embodiments of the present disclosure can ensure system security. In the system, critical functions that must not be bypassed are required to be realized in the ROM.

The functional group of the root of trust further comprises:

a submodule for root of trust measurement function, configured to determine whether the system operating environment is under a known secure state according to a system state characteristic value collected and calculated by the PBA module, wherein the function of PBA will be clarified in subsequent explanations;

a submodule for root of trust for storage functions, configured to provide a protected secure storage space for storing measurement results and other sensitive information;

a submodule for root of trust for reporting functions, configured to cryptographically sign the measurement results, and submit them to the host system according to predetermined security protocols when requested by the management software running in the host system.

The storage space included in the solid-state drive subsystem is divided into a drive subsystem storage space and an operating system space. The drive subsystem storage space is used to store data related to drive subsystem firmware and system management. The operating system space can be addressed by logical block address LBA, and is used to store information comprising the operating system and user programs and data. The operating system space contains a special storage space namely the MBR module in traditional BIOS systems or a boot file in a UEFI system. A method to read the special storage space is always known by the platform firmware of all systems, and is commonly used to store the first stage in the system boot chain. The function of the system boot program in traditional solutions is to load the operating system gradually, stage by stage. In a system which is designed according to the present disclosure, the above-mentioned first stage boot program (e.g., MBR) is hidden in the drive subsystem storage space, and the space originally occupied by the boot program is used to store a unique boot program according to the present disclosure. A function of the unique boot program is to load the pre-boot authentication (PBA) module provided according to the present disclosure into the system's main memory and execute the PBA module.

The PBA module can be further divided into a system measurement module and an identity authentication module.

A function of the system measurement module is to measure the state of measurable elements in the system, including the system firmware, a CPU serial number and address code of network MAC etc., by use of a cryptographic algorithm, to generate characteristic signature of the current system operating environment. The characteristic signature values can be sent to the root of trust through a security protocol to determine whether the operating environment of the system is in a known security state.

A function of the identity authentication module is to collect the user identity authentication information (e.g., password, fingerprint, voice feature code, etc.) from a system interface according to design requirements, and submit it to the solid-state drive subsystem to achieve identity authentication based on predetermined security protocol.

The foregoing only describes some preferred embodiments of the present invention, and is not intended to limit the present invention. Any modification, equivalent substitution, improvement, etc., made within the spirit and principle of the present invention should be included within the scope of protection of the present invention.

What is claimed is:

1. A system for realizing a trusted computing platform, wherein the system comprises:
   at least one host system and at least one hard drive subsystem containing a hard drive controller,
   wherein the host system comprises at least one CPU (Central Processing Unit) and a platform firmware required to form a computer system,
   the hard drive controller comprises hardware and software components required by a traditional hard drive and further comprises:
   a processor, a random number generator, a read-only memory, an engine for operating a cryptographic algorithm set, an ordinary storage space, a system-data storage space protected by a cryptographic algorithm, and a user-data storage space also protected by a cryptographic algorithm,
   said cryptographic algorithm set comprises an international-standard compliant cryptographic algorithm set including RSA, SHA and AES, and/or comprises a Chinese-national-standard compliant cryptographic algorithm set including SM2, SM3 and SM4, and/or comprises multiple cryptographic algorithm sets including RSA, SHA, AES, SM2, SM3 and SM4,
   the system-data storage space comprises a solid-state drive subsystem firmware, and a reserved storage space configured to store a copy of master boot record (MBR) code according to a traditional hard drive system,
   the ordinary storage space comprises at least a portion of system boot loader configured to be executed for loading special pre-boot authentication (PBA) code, both said system boot loader and said PBA code are executable codes running on the host system,
   the user-data storage space comprises an operating system and user data,
   wherein the PBA code is configured to be executed for judging whether measurable components comprising the platform firmware and the operating system are in a known security state by use of a cryptographic algorithm and a root of trust, so that the operating system is booted under a condition when it is judged, by executing the PBA code that a system operating environment is in an acceptable security state and a user identity is legal,
   wherein the solid-state drive subsystem firmware comprises:
   a code for achieving a set of solid-state drive functions configured to support solid-state drive ordinary operations; and
   a code for achieving a set of root of trust functions, configured to support related functions of the root of trust,
   wherein at least the processor, the random number generator, and the engine for operating the cryptographic algorithm set are shared for executing the code for achieving the set of root of trust functions and the code for achieving the set of solid-state drive functions.

2. The system according to claim 1, wherein the special pre-boot authentication code further comprises a system integrity measurement code and a user identity authentication code,
   the system integrity measurement code is configured to be executed for performing operations on measurable characteristics, includeing a system firmware code, a CPU serial number, a MAC address of network card, in the system by use of cryptographic algorithms, to obtain a system operating environment integrity signature value, which is submitted, through a security protocol, to a system integrity verification function achieved in the solid-state drive subsystem,
   the user identity authentication code is configured to be executed for collecting user identity information, which includes a user password, a fingerprint identification code, a voice characteristic code, by use of a relevant interface in the system, and submit the user identity information to the identity authentication function achieved in the solid-state drive subsystem using predetermined security protocol, thereby determining user's legal identity and an associated access permission which can be granted to the user.

3. The system according to claim 2, wherein,
   the solid-state drive ordinary drive operations include reading, writing, data encryption and/or data decryption operation, which are commonly required by a traditional solid-state drive,
   the related functions of the root of trust for the system include:
   a key generation function;
   a root of trust for measurement function set;
   a root of trust for storage function set;
   a root of trust for reporting function set;
   a function to generate a special system identifier of the system; and/or
   a root of trust for Interface function set.

4. An apparatus for implementing a trusted computing platform, comprising:
   a host system, comprising a system firmware;
   a solid-state drive subsystem, connected and communicated with the host system through an interface, wherein the solid-state drive subsystem comprises a processor, a random number generator, a set of cryptographic algorithm engines for operating a cryptographic algorithm set, an ordinary storage space, a system-data storage space protected by a cryptographic algorithm, and a user-data storage space protected by a cryptographic algorithm for storing an operating system and user data,
   said cryptographic algorithm set comprises an international-standard compliant cryptographic algorithm set including RSA, SHA and AES, and/or comprises a Chinese-national-standard compliant cryptographic algorithm set including SM2, SM3 and SM4, and/or comprises multiple cryptographic algorithm sets including RSA, SHA, AES, SM2, SM3 and SM
   the system-data storage space comprises a solid-state drive subsystem firmware, and a reserved storage space configured to store a copy of master boot record (MBR) code according to a traditional hard drive system,
   the ordinary storage space comprises at least a portion of system boot loader configured to be executed for loading special pre-boot authentication (PBA) code, both said system boot loader and said PBA code are executable codes running on the host system,
   wherein, the solid-state drive subsystem further comprises the pre-boot authentication code, which is configured to be executed for judging whether measurable components comprising the system firmware and the operating system are in a known security state by use of a cryptographic algorithm and a root of trust, so that the operating system is booted under a condition when it is judged, by executing the pre-boot authentication code, that a system operating environment is in a security state and a user identity is legal, wherein the storage space comprises a solid-state drive subsystem firmware, which comprises:

a code for achieving a set of solid-state drive functions configured to support solid-state drive ordinary operations; and a code for achieving a set of root of trust functions, configured to support related functions of the root of trust, wherein at least the processor, the random number generator, and the cryptographic algorithm engine are shared for executing the code for achieving the set of root of trust functions and the code for achieving the set of solid-state drive functions.

5. The apparatus according to claim 4, wherein:

the system-data storage space comprises a solid-state drive function boot loader; and the ordinary storage space, which could be a portion of said user-data storage space.

6. The apparatus according to claim 5, wherein the system-data storage space is provided by a read-only memory.

7. The apparatus according to claim 4, wherein, the solid-state drive ordinary operations comprise a read operation, a write operation, a data decryption operation, and/or a data decryption operation; and the related functions of the root of trust comprise a root of trust for measurement function, a root of trust for storage function, a root of trust for reporting function, a key generation function, a system identity generation function and/or a root of trust for interface function.

8. The apparatus according to claim 4, wherein the pre-boot authentication code comprises:

a measurement code, configured to be executed for calculating the measurable components by use of a cryptographic algorithm, to obtain a characteristic value of each one of the measurable components under current system operating environment, wherein the characteristic value is sent into the root of trust through a security protocol so as to determine whether the system operating environment is in a known security state; and an identity authentication code, configured to be executed for collecting user identity information, wherein the solid-state drive subsystem is configured to realize user identity authentication based on the user identity information, and grant access permission to the authenticated user when the user identity information is authenticated to be legal.

9. The apparatus according to claim 4, wherein the solid-state drive subsystem further comprises a boot loader for the pre-boot authentication code, wherein the boot loader for the pre-boot authentication code is configured to be executed for loading the pre-boot authentication code from the solid-state drive subsystem into a main memory in the host and booting the pre-boot authentication code to be executed.

10. An operation method for a trusted computing platform, wherein the operation method comprises:

after the trusted computing platform is powered on, running a system firmware of a host system and a solid-state drive subsystem firmware;

running a pre-boot authentication code, based on a solid-state drive subsystem comprising a processor, a random number generator, a set of cryptographic algorithm engines for operating a cryptographic algorithm set, an ordinary storage space, a system-data storage space protected by a cryptographic algorithm, and a user-data storage space protected by a cryptographic algorithm for storing an operating system and user data;

said cryptographic algorithm set comprises an international-standard compliant cryptographic algorithm set including RSA, SHA and AES, and/or comprises a Chinese-national-standard compliant cryptographic algorithm set including SM2, SM3 and SM4, and/or comprises multiple cryptographic algorithm sets including RSA, SHA, AES, SM2, SM3 and SM4, the system-data storage space comprises a solid-state drive subsystem firmware, and a reserved storage space configured to store a copy of master boot record (MBR) code according to a traditional hard drive system, the ordinary storage space comprises at least a portion of system boot loader configured to be executed for loading the pre-boot authentication (PBA) code, both said system boot loader and said PBA code are executable codes running on the host system, if it is determined, by executing the pre-boot authentication code, that a system operating environment is in a security state and user identity is legal, running a boot program for the operating system, soas to boot the operating system, wherein, the pre-boot authentication code is configured to be executed for judging whether measurable components comprising the system firmware and the operating system are in a known security state by use of a cryptographic algorithm and a root of trust, wherein the solid-state drive subsystem firmware comprises:

a code for achieving a set of solid-state drive functions configured to support solid-state drive ordinary operations; and a code for achieving a set of root of trust functions, configured to support related functions of the root of trust, wherein at least the processor, the random number generator, and the cryptographic algorithm engine are shared for executing the code for achieving the set of root of trust functions and the code for achieving the set of solid-state drive functions.

11. The operation method according to claim 10, wherein the root of trust is set up in the step of running the solid-state drive subsystem firmware.

12. The operation method according to claim 10, wherein the root of trust comprises:

a root of trust for measurement, at least configured to measure the system firmware, the boot program for the operating system, and the operating system itself to obtain measurement results;

a root of trust for storage, configured to provide a secure storage space for storing the measurement results; and a root of trust for reporting, configured to issue relevant reports according to the measurement results, so as to indicate whether the current system operating environment is in a security state.

13. The operation method according to claim 10, wherein the step of running the pre-boot authentication code comprises:

obtaining a characteristic value of each one of the measurable components under the current system operating environment by performing calculation, wherein the characteristic value is sent to the root of trust through a security protocol so as to determine whether the system operating environment is in a known security state; and under a condition that the system operating environment is in a known security state, transferring a system control right to execute an identity authentication code of the pre-boot authentication code, so as to collect user identity information by executing the identity authentication code and grant access permission to the authenticated user when the user identity information is authenticated to be legal.

14. The operation method according to claim 13, wherein the step of obtaining the characteristic value of each one of the measurable components under the current system operating environment by performing calculation comprises:

measuring the measurable components to obtain the characteristic value of each one of the measurable components under the current system operating environment by use of a cryptographic algorithm;

comparing the obtained characteristic value with a pre-stored measured value, wherein the pre-stored measured value is a characteristic value obtained by measuring a corresponding one of the measurable components under a known security condition; and under a condition that the obtained characteristic value is consistent with the pre-stored measured value, determining that the system operating environment is in a security state, and transferring an execution right to the corresponding one of the measurable components.

15. The operation method according to claim 10, wherein, prior to the step of running the pre-boot authentication code, the operation method further comprises:

loading the boot loader for the pre-boot authentication code into a main memory and executing the boot loader for the pre-boot authentication code, so as to load the pre-boot authentication code into the main memory from the solid-state drive subsystem and execute the pre-boot authentication.

\* \* \* \* \*